March 13, 1962

JAMES T. BYRD
KNOWN AS JACK T. BYRD
OUTBOARD PROPELLER DRIVE FROM INBOARD
ENGINE AND STEERING MECHANISM

3,024,759

Filed March 23, 1959

INVENTOR.
JAMES T. BYRD KNOWN AS
JACK T. BYRD
BY
Lynn H. Latta
ATTORNEY

March 13, 1962

JAMES T. BYRD
KNOWN AS JACK T. BYRD
OUTBOARD PROPELLER DRIVE FROM INBOARD
ENGINE AND STEERING MECHANISM

3,024,759

Filed March 23, 1959

INVENTOR.
JAMES T. BYRD KNOWN AS
JACK T. BYRD
BY
Lynn H. Latta
ATTORNEY

Fig. 11

United States Patent Office 3,024,759
Patented Mar. 13, 1962

3,024,759
OUTBOARD PROPELLER DRIVE FROM INBOARD ENGINE AND STEERING MECHANISM
James T. Byrd, known as Jack T. Byrd, 638 Howland Drive, Apt. 4, Inglewood, Calif.
Filed Mar. 23, 1959, Ser. No. 801,109
20 Claims. (Cl. 115—41)

This invention relates to the drive and steering mechanism of outboard motorboats. Its general object is to provide an improved drive mechanism utilizing an inboard motor and a transmission extending through the transom of a motorboat for driving an outboard propeller in an outboard propeller and rudder mechanism.

Another object is to provide such an outboard drive and steering mechanism having means mounting the same for upward and rearward swinging movement from a normal drive positon to an elevated inoperative (towing) position.

One of the objects of the invention is to provide such an outboard propeller and rudder unit which is adapted to be elevated (to swing upwardly and rearwardly) without damage in the event it meets an obstruction in the water passed over by the boat during forward travel. A further object is to provide such a drive and rudder unit having means for locking out the same against such elevating movement when employed for tractor driving of the boat in reverse, which can be operated manually or by power. A further object is to provide such a lockout mechanism having a remotely controlled electric actuator for effecting the locking and unlocking operations.

A further object is to provide, in a combined drive and steering mechanism of the type outlined above, an improved means for transmitting steering movement to the steerable rudder and propeller unit in a non-interfering relation to the upward and rearward swinging movement of the apparatus over obstructions.

A further object is to provide an improved gear shifting mechanism in an inboard driven outboard drive of the kind herein contemplated.

A further object is to provide such a mechanism which, when in elevated or towing position, has its propeller automatically disengaged for safety.

Another object is to provide such a drive mechanism in which, by use of gears, the power torque is reduced to a negligible factor, exerting no force on the steering wheel.

A further object is to provide a combined drive and steering mechanism of the type outlined, which is of relatively simple and inexpensive yet sturdy and efficiently operable construction.

Other objects and advantages will become apparent in the ensuing specification and appended drawing in which.

GENERAL DESCRIPTION

Referring now to the drawings in detail, the improved drive and steering apparatus of my invention comprises, in general, a drive transmission including a unit A which is fixedly attached to the rear side of a boat transom 10, an upwardly swinging transmission unit B which is pivotally attached to fixed unit A on a horizontal axis or common transverse axis parallel to the transom 10, a steerable unit C which is attached to the normally underside of unit B for steering movement on a vertical axis, and a conventional spinner and propeller unit D attached to the lower end of the steerable transmission unit C; bearing apparatus E for transmitting forward driving thrust from the steerable unit C to the boat transom while accommodating the steering movement; gear shifting apparatus F; steering apparatus G; and anti-lift lock mechanism H for locking the swinging unit B to the fixed unit A for reverse drive operations.

Drive is transmitted through the transmission gearing E which is contained in the housing parts of units A, B, C, and D, along a drive path extending rearwardly from an inboard motor through the transom 10, thence extending horizontally and transversely between units A and B, thence extending normally downwardly through units B and C and D, and thence extending rearwardly in the lower area of unit D to a propeller 69 which is mounted at the rear end thereof. Steering is transmitted directly to the steerable unit C which, with unit D, can be steered about the vertical axis of drive downwardly from unit B to unit D. As torque is applied forwardly to unit D by propeller 69, the assembly of units B, C, and D tend to swing forwardly around the horizontal and common transverse axis of drive between units A and B. Employing the pivotal connection between units A and B as a fulcrum, the unit C transmits the forward thrust to the boat transom through the bearing unit E, without interfering with steering. Gear shift apparatus F is arranged to transmit shifting movement (forward to reverse and vice versa) to the shiftable portion of the gearing without interfering with the steering operation.

Steering apparatus G is arranged to transmit steering movement to the steerable assembly of units C and D without interfering with upward swinging of units B, C and D or being interfered with by such upward swinging movement. Reverse locking mechanism H is arranged to lock or unlock the units A and B with reference to each other when the assembly of units B, C and D is in a normal vertically depending position, said locking and unlocking being effected by remote control on the electrical actuator forming part of the apparatus H. When the unit H is unlocked, the assembly of units B, C and D is adapted to swing upwardly and rearwardly in order to ride over any obstruction which may be engaged by the forward extremity of unit D as the mechanism is driving a boat forwardly through the water. In thus swinging upwardly, the assembly B, C and D rotates about a transverse horizontal pivot which is provided by a countershaft 12 which extends through the units A and B, joining them together.

Having given the foregoing brief general description of the invention, I will now describe in detail the various units of the apparatus, beginning with

The Fixed Unit A

The fixed unit A (FIGS. 6 and 8) comprises a casting including a bowl shaped gear case section 13, a tubular neck 14 projecting from the forward side thereof, a radial flange 15 adapted to be attached to the boat transom 10 by means of bolts 16, and a cylindrical bearing boss 17 which is received in a corresponding aperture in the transom 10. Within neck 14 and boss 17 are a bore 18 and counterbore 19, bearings 20 being mounted in counterbore 19. A drive shaft 21 extends through the bearing 19 and through the bore 18 to the interior of case section 13 and being journalled in a bearing 22 in a counterbore at the inner end of bore 18. In the end of gear case section at right angles to the axis of shaft 21, is a boss 23 in which is mounted one end of the transverse pivot or countershaft shaft 12. A pin 24, anchored in shaft 12 and engaged in a key slot 25 in boss 23, fixes the shaft 12 in casing section 12 against rotation. A nut 26 threaded on a reduced end of shaft 12 provides end bearing engagement against the case section 13. Case section 13 has an open side defined by a rim 27 which has a pair of concentric annular face grooves 28 and 29. The inner groove 29 seats a hardened metal (e.g. steel) bearing ring 30 of toroidal form (of circular cross section) and the outer groove 28 seats an O ring gasket 31. As shown, the said ring 30 is a split-ring as clearly indicated in FIG. 6.

The Swinging Case Unit B

The swinging unit B (FIGS. 6 and 8) comprises a bowl shaped gear case section 32 in symmetrically coupled relation to case section 13, the section 32 having a rim 33 mating with rim 27 and provided with an annular face groove complementary to the groove 29 and receiving the bearing ring 30. This face groove, and the opposed face groove 29, are semi-toroidal to mate with the toroidal shape of bearing ring 30. Rim 33 is sealed against O-ring 31. Case section 32 has an internal end boss 34 in remote coaxial relation to boss 23 and provided with a bearing bushing 35 in which the other end of countershaft 12 is journalled. The nut 36 and washer 37 provide end bearing engagement between the shaft 12 and the end boss 34, and in cooperation with the securing nut 26 and washer 88, secure the case sections 13 and 32 in coupled relation, coupled through the torque ring 30 for rotation of the unit B around the shaft 12. The torque ring 30 provides a high load-bearing rotatable connection between casing sections 13 and 32, maintaining accurate concentricity and free rotatability thereof in the presence of heavy shear loads and other stresses applied between the casing sections. Ring 30 is lubricated by lubricant seeping between the mating interfaces of the casing sections, while O-ring 31 (of oil resistant rubber or equivalent) seals the casing against escape of such lubricant.

Figures 5, 7, 8:
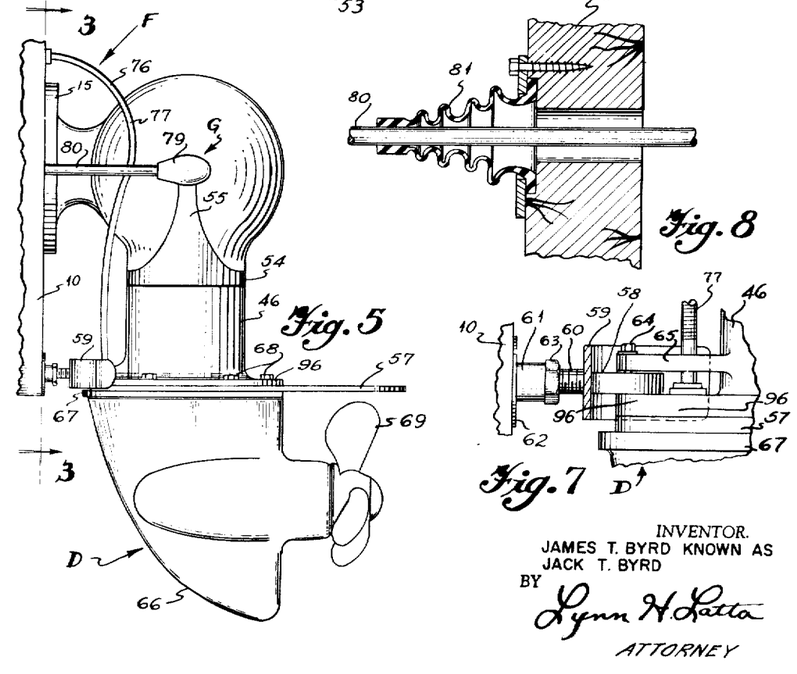
FIG. 5 is a side view of the apparatus.
FIG. 7 is a detail fragmentary side view taken on line 7—7 of FIG. 4.
FIG. 8 is a detail sectional view of the bellows seal of the steering linkage.
Figure 6:
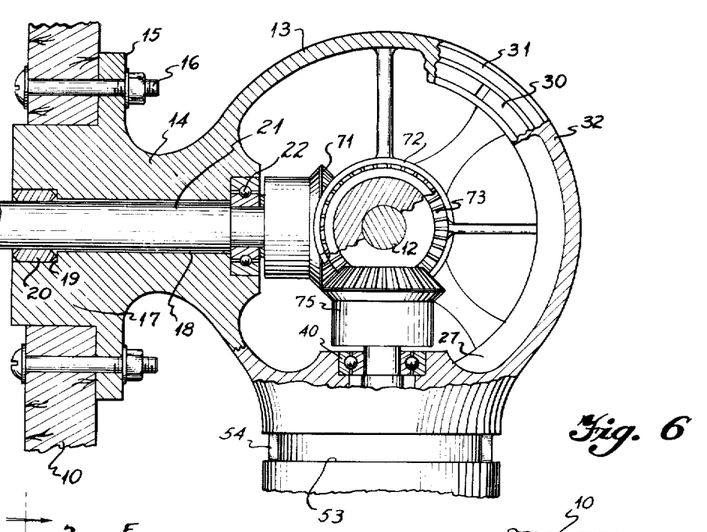
FIG. 6 is a vertical sectional view through the transmission gearing taken on the line 6—6 of FIG. 1.
Figure 9:
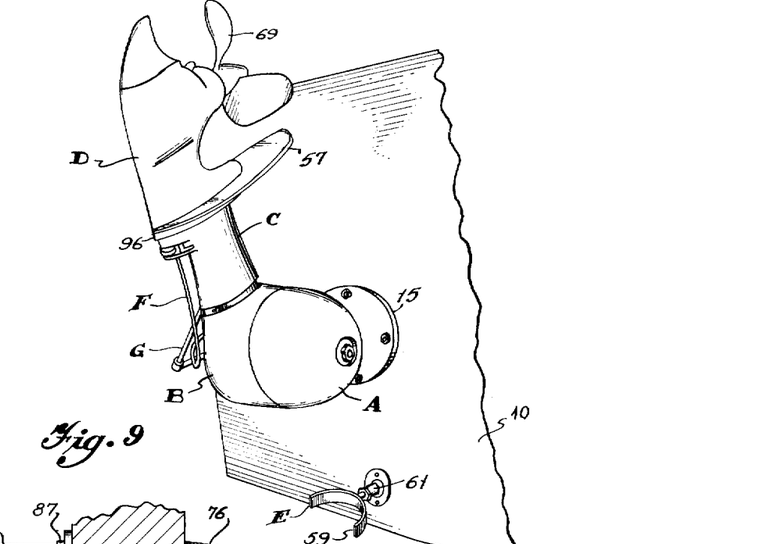
FIG. 9 is a perspective view of the apparatus.

Projecting radially from the axis of countershaft 12 and from the lower side of case section 32 at right angles to shaft 12 and extending normally downwardly, is a cylindrical and tubular neck 38, integral with case section 32. The lower end of neck 38 is necked down and mounted in a thrust bearing 39. In the upper end of neck 38 is a ball bearing 40 in which is journalled the upper end of a normally vertical shaft 41.

Casing sections 13 and 32 are hydraulically sealed to one another through the O-ring 31 and provide a lubricant chamber in which a suitable lubricating oil may be contained, supplied from case oil. Referring now to FIG. 6, wherein a fragmentary portion of the rotatable joint between the two case sections is disclosed, it may be noted that the bearing ring 30 is a split ring, a passage being defined between the spaced ends thereof through which oil may enter the annular interface space between flanges 27 and 33 for maximum lubrication between the flanges and of O-ring 31.

A flat radial annular shoulder 42 is defined in the lower side of section 32 where neck 38 is integrally joined thereto. In the shoulder 42, in coaxial relation to neck 38, is an annular semi-toroidal groove 43 which receives one side of an O-ring gasket 44. At its lower end, adjacent the reduced neck thereof that is piloted in bearing 39, the neck 38 is turned down to provide an oilite bearing seat 45.

The Steerable Unit C

The steerable unit C comprises a cylindrical steering sleeve 46 which receives and is journalled upon the neck 38 by means of an oilite bearing 47 at its upper end and an oilite bearing 48 at its lower end. Oilite bearing 47 is mounted in a counterbore 49 in the upper end of sleeve 46 and bearing 48 is mounted upon the turned-down portion on the lower end of neck 38. At its upper end, sleeve 46 has a semi-toroidal groove mating with groove 43 and receiving the lower half of gasket 44. At its lower end, sleeve 46 has an integral hub 50 which is provided with a counterbore 51 forming an end bearing socket in which is mounted a ball-bearing 52. The bearing 39 is an end-thrust bearing which is interposed between the shoulder defined by the inner end of hub 50 and the shoulder defined at the base of the reduced end portion of neck 38. The lower end of shaft 41 is mounted in the ball-bearing 52 and is retained by a snap ring 52′ transmitting end thrust. At its upper end, sleeve 46 is formed with an annular flanged channel 53 defining an annular groove of rectangular section in which is received a fork portion 54 of a steering yoke 55. The ends of the arms of fork 54 are attached to sleeve 46 by screws 56 threaded into the upper end of the sleeve 46. Screws 56 are mounted at exact center to facilitate changing to opposite sides, when 46 is used on opposite side.

An elongated mounting flange 96 is formed integrally with hub 50 and projects forwardly and rearwardly (at right angles to the axis of shaft 12).

It may now be noted that sleeve 46 provides a steerable mounting for a spinner-propeller unit D which is bolted to the lower face of mounting flange 96 with an anti-cavitation plate 57 secured therebetween, its longitudinal axis parallel to that of the flange 96.

More specifically, this adjustment is effective to vary the angle, with reference to the longitudinal axis of the boat, of the propeller drive axis to provide either (a) a downward and rearward tilt for obtaining a lifting (climbing) component from the forward thrust, to elevate the rear end of the boat when heavily loaded there; or (b) to attain a downward and forward tilt of the propeller axis, providing a downward (diving) component of thrust which tends to lift the forward end of the boat. The adjustable connection between the bearing race 59 and the transom comprises an integral stem 60 projecting forwardly from the center of the yoke 59, which is segmental or semi-cylindrical in form, and threaded into an internally threaded socket of a bracket 61 which is secured at 62 to the transom 10. A jam nut 63, threaded on the stem 60, is operative when tightened against the rear end of bracket 61, to lock the stem 60 against rotation, thereby securing the bearing yoke 59 in any selected position of adjustment. To adjust the yoke, it is rotated 180° from a previous position, thus providing an increment of adjustment equivalent to one half the pitch of the thread on stem 60.

Roller 58 is a neoprene or rubber roller with a bronze bushing for a hub, said bushing being journaled upon the smooth cylindrical shank of a bolt 64 which extends parallel with the axis of sleeve 46 and downwardly through an integral ear 65 projecting forwardly on the lower end of sleeve 46, thence through the roller 58, thence through the forward portion of elongated flange 96, thence through the cavitation plate 57 and into the forward top portion of the spinner unit D, into which it is threaded.

The arcuate bearing surface of yoke 59 is considerably wider (vertically) than the peripheral bearing face of roller 58 (e.g. the latter may be ⅜ of an inch wide and the former approximately 1¼ inches wide) whereby as the spinning unit D is tilted forwardly toward the transom, the roller 58 will ride high on the yoke surface whereas when the spinner unit D is tilted rearwardly the roller 58 will ride low on the yoke surface.

The bearing surface of yoke 59 is of segmental cylindrical contour, coaxial with sleeve 46.

Propeller-Spinner Unit D

The unit D is a conventional propeller-spinner unit and accordingly the details of construction thereof are not disclosed herein. The unit includes a rudder casting 66 having at its upper end a flange 67 which is bolted to the mounting flange 56 by bolts 68 (and the bolt 64) extending through the flange 96 and anti-cavitation plate 57 and threaded into the flange 67. The conventional propeller 69 is driven through conventional shafting and bevel gearing which is not shown except for the vertical shaft 41 (FIG. 8) which is attached to the shaft 41 and extends downwardly into the unit D.

Thrust Transmitting Bearing Unit

Figures 1, 4:
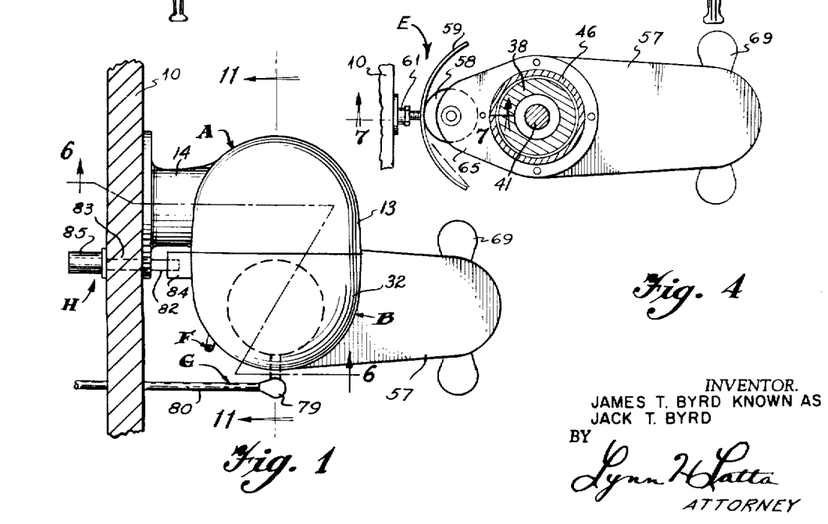
FIG. 1 is a plan view of a combined drive and steering apparatus embodying the invention.
FIG. 4 is a horizontal sectional view.
Figure 2:
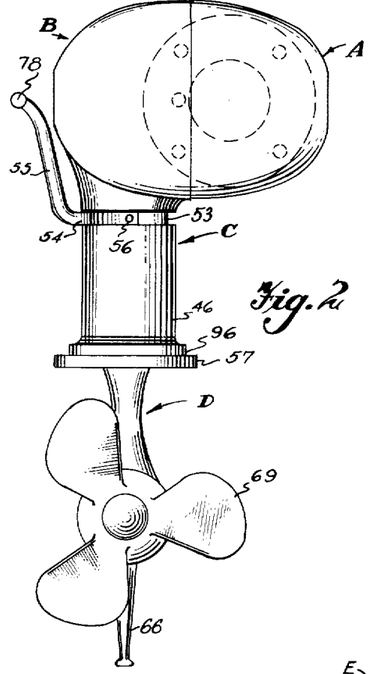
FIG. 2 is a rear elevational view of the same.
Figure 3:
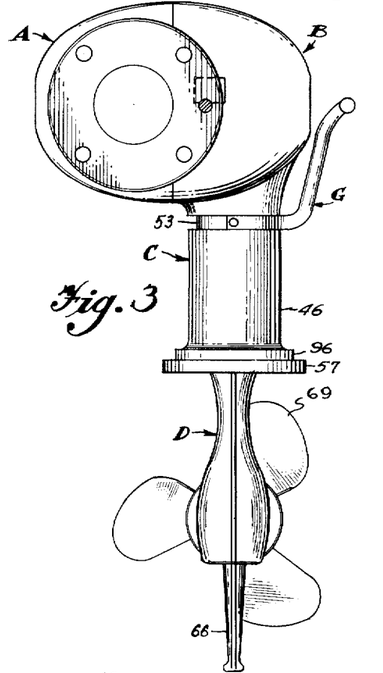
FIG. 3 is a front elevational view of the same, partially in section as indicated by line 3—3 of FIG. 5.

When the apparatus is driving the boat forwardly, forward-thrust is transmitted from the propeller unit D through the steerable unit C to the transom 10 by means of a bearing roller 58 (FIG. 4) which bears against a concave arcuate bearing yoke 59 attached to the transom 10. Yoke 59 is adjustably mounted upon transom 10 for forward and aft adjustment of the propeller unit D (and units B and C) around the axis of transverse countershaft 12, for the purpose of adjusting the thrust angle of the propeller, contributing to the trim of the boat.

Gearing

Referring now to FIGS. 6 and 7, drive is transmitted from the engine-driven drive shaft 21 through a bevel gear 71, secured on its rear end within fixed gear case section 13, thence to a bevel gear 72 which is mounted on transverse countershaft 12, thence to an oppositely facing bevel gear 73 which is clutched to the gear 72 through dog clutch at 74 on the respective hubs of the gears 72 and 73; thence to a bevel gear 75 secured on the upper end of the vertical shaft 41. From the shaft 41 the drive proceeds to the gearing of the propeller-spinner unit and thence to the propeller. A washer seal 70, of neoprene or equivalent material, seals the counter bore in which the bearing 52 is mounted.

Shift Mechanism F

The gear shifting mechanism F comprises simply a flexible tube 76 extending from an anchored point generally at the fixed housing section 13 near the center and to the left of the transom 10 and then downwardly and rearwardly ahead of the swinging transmission section B in a vertical plane generally parallel with the axis of shaft 41, thence downwardly and centrally in front of the sleeve 46 and through registered openings in flange 96, anti-cavitation plate 57 and into the casting 66. The tube 76 is flexible and extends transversely from the anchor point shown in FIG. 10 over the neck 14, so as to be looped as it extends to the propeller-spinner unit. A push-pull cable 77 extends through the conduit 76 and is connected at its lower end to the conventional gear shift mechanism which is biased to a normal position establishing forward drive and which can be released and shifted to neutral and reverse drive positions by pulling upon the cable 77.

Steering Apparatus G

The steering apparatus G comprises the steering lever 55, secured to sleeve C as previously described and terminating at its upper end in an integral universal-self aligning bearing ball 78. A universal bearing 79 connects the ball 78 to a steering link 80 (a straight rod) which is slidably extended through a soft rubber or neoprene bellows seal 81 attached to the inner face of the transom 10. Ball 78 has its center disposed on the axis of transfer shaft 12, and the axis of bearing 79 coincides with the axis of shaft 12, whereby the assembly of units B, C, and D may swing upwardly and rearwardly about the pivot of countershaft 12 to the limit hereinafter referred to, without affecting the position of steering link 80 (so long as the unit D is in a neutral position with the axis of the propeller drive shaft lying in a vertical median plane of the boat). It will be apparent that by shifting the steering link forwardly and rearwardly, the steering arm 55 will be swung arcuately around the vertical axis of shaft 41, oscillating the sleeve 46 and unit D for steering.

Lift Lock H

The mechanism H comprises a locking bolt 82 (FIG. 1 and FIG. 10) slidably mounted in a bearing bushing 83 in transom 10 and adapted to be projected into abutting engagement with a stop lug 84 attached to the case section 32 and to engage said lug to restrain rearward swinging of the propeller unit D in response to reverse operation of propeller 69. Thus the backward pull of propeller 69 as operated in reverse will be transmitted through the units D, C and B to the reverse lock bolt 82 and thence to the unit A and to the boat transom, for pulling the boat backwardly. This locking engagement is established in a neutral position of the propeller unit D in which the axis of the propeller shaft is substantially parallel to the longitudinal axis of the boat.

Figure 10:
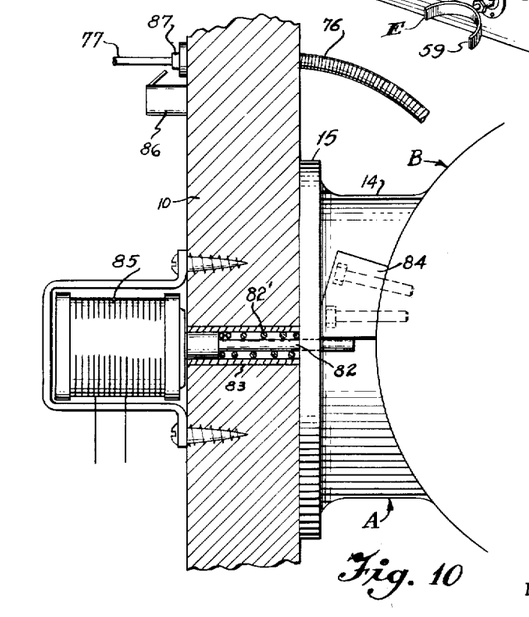
FIG. 10 is a vertical sectional view showing the lift-lock, taken on the line 10—10 of FIG. 1.
Figure 11:
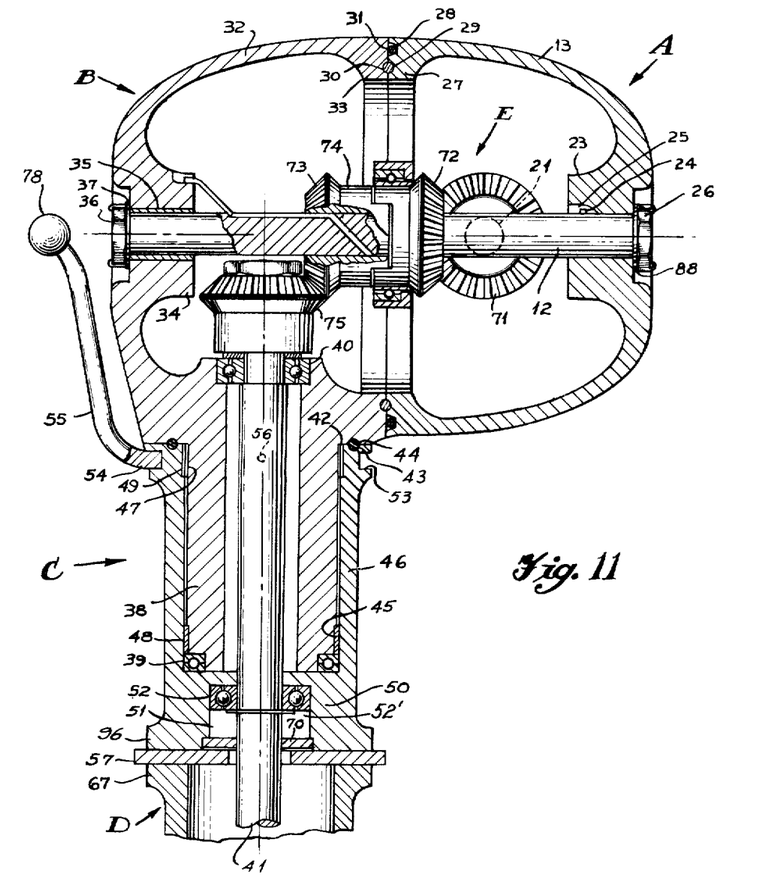
FIG. 11 is a vertical sectional view through the apparatus looking toward the transom as indicated by the line 11—11 of FIG. 1.

The bolt 82 is normally retracted by a coil spring 82' and projection of the bolt 82 is effected by energizing a solenoid 85 which may be mounted on the transom 10 within a bushing 83 that houses the coil spring 82', as shown in FIG. 10. Solenoid 85 is energized simultaneously with the shifting of the transmission into reverse gear. This is provided for by an actuator connection between the shifting mechanism F and a control switch suitably mounted in the boat. By way of example, FIG. 10 illustrates a switch 86, spring biased to a normally open position and having an actuator lever projecting into the path of movement of a collar 87 on the shift cable 77 whereby as the latter is pulled forwardly to shift into reverse, the actuator lever of the switch 86 will be engaged and shifted to the closed position for energizing the solenoid 85, thus to project the bolt 82 into a locking engagement with lug 84. Alternatively, the bolt 82 may be operated manually by bell crank mechanism.

OPERATION

In the operation of the apparatus of my invention, the propeller 69, in normal forward drive, will be driven from the inboard engine through drive shaft 21, the gearing in gear casing 13, 32, the downwardly extending transmission shaft 41, and the gearing unit D, forward thrust tending to swing the unit D forwardly around the axis of transverse countershaft 12, being transmitted through roller 58 and bearing yoke 59 to the transom D so as to drive the boat forwardly. During such forward drive, the unit D may be pivoted around the axis of transmission shaft 41 by the operation of the steering mechanism G, the roller 58 riding from side to side on the bearing yoke 59. By adjusting the mounting parts 60—62 to shift the bearing yoke 59 forwardly or rearwardly, the fore-aft tilt of the axis of the propeller drive shaft, for attaining either a dive or climb component of the forward thrust from propeller 69, may be attained as previously described.

For reverse operation, the gear shift cable 77 is pulled forwardly, transmitting gear shifting movement to the conventional gearing within unit D to shift it from its forward drive position (to which it is normally biased) to a reverse drive position from which it will return to its forward drive position when the pull on cable 77 is released. Coincidentally with the movement of cable 77 to shift the gearing into reverse drive, the switch 86 will be closed to actuate solenoid 85 which is effective to project to locking bolt 82 into locking engagement with lug 84 to lock out the units B, C, D against rearward swinging around the axis of countershaft 12, so that the reverse drive can be transmitted to the bolt transom.

In the event unit D meets an obstruction passed over by the boat, the assembly of units B, C, and D will swing rearwardly and upwardly around the axis of transverse countershaft 12, allowing the apparatus to ride over the obstruction without any damage or interference with its operation. When this occurs, the roller 58 will simply move away from the bearing yoke 59, returning into contact therewith when the swinging assembly returns to its normal driving position after the obstruction has been passed. When it is desired to beach the boat or to tow it, the assembly of swinging units B, C and D, may be swung upwardly, rearwardly overhead and thence forwardly, to rest against the transom 10 in an upwardly and forwardly inclined position. In this connection, the conduit 76 of the gear shift apparatus F is so contoured with relation to the upper margin of the transom 10 with its relation to the axis of countershaft 12 that it will avoid contact with the transom throughout the path of upward swinging movement of the swinging assembly.

The drive may be used as either left or right hand. Also, counter rotating propellers may be used, as rotation is accomplished by simply reversing two gears in the lower unit D. The change from right hand to left hand drive and vice versa can be simply effected by reversing the positions of steering yoke 54 and propeller unit D with respect to units B, C (i.e. by loosening them) rotating them 180° and fixing them in the new positions.

The drive unit may be used in a tractor position of the propeller unit D, by rotating the unit D 180°, removing the cavitation plate and replacing it by a like thickness shim, and rotate the steering unit 180° as necessary to change the direction of rotation of the propeller, thereby increasing the efficiency of the propeller 15 to 18 percent.

I claim:

1. In an outboard drive for a motorboat having an inboard engine and at its rear end a transom: a transmission housing comprising fixed and swinging housing sections including respective mating circular rims having respective registering semi-toroidal face grooves and at least one of said rims having a circular face groove disposed radially outwardly of and concentric with its respective semi-toroidal groove; a toroidal bearing ring of hardened metal engaged in the respective semi-toroidal grooves to provide a rotatable bearing connection between said housing sections maintaining them in coaxial alignment on a common transverse axis thereof, said fixed housing section having a tubular neck projecting radially forwardly from said common transverse axis, secured to said transom and maintaining said common axis in a horizontal position transverse to the major longitudinal axis of the boat, said swinging housing section having a tubular neck extending radially and normally downwardly from said common transverse axis and adapted to swing upwardly from its normally downward position to an overhead position to render the drive mechanism inoperative; an O-ring gasket received in said circular face groove of the one housing rim and compressively sealed against the other housing rim to provide a hydraulically sealed rotatable joint between said housing sections, said toroidal bearing ring being of split ring form and having spaced ends providing a radial passage for entry of lubricant from the interior of the housing into the space between said toroidal bearing ring and gasket for maximum lubrication of the mating faces of said rims; a countershaft extending through said housing sections on said common transverse axis and having at its respective ends, securing means engaging the respective ends of the housing sections to secure them in bearing engagement with said toroidal bearing ring; a drive shaft journalled in said tubular neck of the fixed housing section and extending into the latter through the transom and through said neck; a transmitting shaft extending from the interior of said swinging housing through said normally downwardly extending neck thereof; bevel gears on the ends of the respective drive and transmitting shafts within the respective housing sections; and back-to-back bevel gears on said counter shaft having a direct drive connection with one another and meshing with said first mentioned bevel gears respectively in transverse offset driving relation therebetween.

2. A drive as defined in claim 1, wherein said drive connection comprises hub means joining said back-to-back gears, one of said housing sections embodying within its rim a spider including a bearing at its center, in encircling relation to said hub means and providing rotatable bearing support for said back-to-back gears.

3. A drive as defined in claim 1, including a steerable unit comprising a sleeve receiving and journalled upon said normally downwardly extending tubular neck and having at its lower end an end bearing socket and an end flange normal to its axis; an anti-cavitation plate and a propeller and spinner unit secured to said flange and including a propeller driven by said transmitting shaft; an end thrust bearing mounted in said end bearing socket and journalling said transmitting shaft in said sleeve; a snap ring disposed in an annular groove in said transmitting shaft and transmitting, through said end thrust bearing to said sleeve, support to maintain said sleeve in telescoping connection with said normally downwardly extending tubular neck; a steering arm including a fork embracing the upper end of said sleeve and having a steering connection therewith, said arm being inclined laterally from said sleeve and axially beyond the ends thereof and terminating in a universal pivot part centered at the plane of said common transverse housing axis; and a steering link having a universally pivotal connection with said pivot part and extending horizontally forwardly through said transom for connection to a steering actuator.

4. In an outboard drive for a motorboat having an inboard engine and at its rear end a transom: a transmission housing comprising fixed and swinging housing sections including respective mating circular rims; means providing a rotatable bearing connection between said rims maintaining said housing sections in coaxial alignment on a transverse common axis thereof, said fixed housing section having a tubular mounting neck projecting radially forwardly from said transverse axis, secured to said transom, and maintaining said common axis in a horizontal position transverse to the major longitudinal axis of the boat, said swinging housing section having a tubular neck extending radially and normally downwardly from said transverse axis and adapted to swing upwardly from its normally downward position to an overhead position to render the drive mechanism inoperative; a countershaft extending through said housing sections on said common transverse axis and having at its respective ends; securing means engaging the respective ends of the housing sections to secure them in bearing engagement with one another; a drive shaft journalled in said tubular mounting neck and extending into the latter through the transom and through said mounting neck; a transmitting shaft extending from the interior of said swinging housing through said normally downwardly extending neck thereof; bevel gears on the ends of the respective drive and transmitting shafts within the respective housing sections; back-to-back intermediate bevel gears on said countershaft having a direct drive connection with one another and meshing with said first mentioned bevel gears respectively, in transverse offset driving relation therebetween; a steerable unit comprising a steering sleeve telescopically receiving and journalled upon said normally downwardly extending tubular neck; a propeller and spinner unit carried by the lower end of said steering sleeve and including a propeller driven by said transmitting shaft; an end bearing socket in the upper end of said downwardly extending neck; an upper end thrust bearing mounted in said end bearing socket and journalling and supporting said transmitting shaft in said sleeve; a lower end thrust bearing carried by said transmitting shaft, socketed in the lower end of said steering sleeve, end thrust bearing support to maintain said sleeve in rotatable telescoping connection with said normally downwardly extending tubular neck; a steering arm having a steering connection with the upper end of said sleeve, said arm being inclined laterally from said sleeve and axially upwardly beyond the upper end thereof and terminating in a universal pivot part centered on said common transverse housing axis; and a steering link having a universally pivotal connection with said pivot part and extending horizontally forwardly through said transom for connection to a steering actuator.

5. A drive as defined in claim 4, wherein said transom has an opening through which said steering link extends, said opening having lateral clearance around said steering link to accommodate lateral shifting thereof in response to arcuate steering movement of said steering arm, and a boot of bellows form secured to the transom at one end of said opening in coaxial relation to the latter and terminating in a collar snugly encircling and sealed to said steering link, said bellows accommodating longitudinal and transverse movements of said steering link while maintaining the same sealed to the transom.

6. A drive as defined in claim 4, including gear shifting means comprising a flexible conduit having one end anchored in said transom and its other end extending into said propellor-spinner unit generally parallel to the axis of said transmission shaft, and a push-pull cable extending through said conduit from within the boat and thence into said propeller-spinner unit and longitudinally slidable in said conduit, said cable and conduit being flexible, being connected to said transom generally at said fixed housing section, entering said propeller-spinner unit at a point substantially centered in front of said steering sleeve, and being looped transversely over the mounting neck of said fixed housing section whereby to accommodate both steering and upward swinging movement of said propeller-spinner unit.

7. A drive as defined in claim 4, including driving thrust transmitting means comprising a bearing roller rotatably mounted on the forward side of said steering unit sleeve on an axis parallel to the axis of said sleeve, a bearing yoke having a concave bearing face of segmental cylindrical form on a vertical axis facing said steering sleeve and generally coaxial therewith, said bearing roller being in rolling engagement with said bearing yoke, and connecting means adjustably mounting said yoke on said transom, for fore-aft adjustment.

8. A drive as defined in claim 4, including driving thrust transmitting means comprising a bearing roller rotatably mounted on the forward side of said steering unit sleeve on an axis parallel to the axis of said sleeve, a bearing yoke having a concave bearing face of segmental cylindrical form on a vertical axis facing said steering sleeve and generally coaxial therewith, said bearing roller being in rolling engagement with said bearing yoke, and connecting means adjustably mounting said yoke on said transom, for fore-aft adjustment, said connecting means comprising a threaded socket secured to said transom on a fore-aft axis, a threaded stem secured to said yoke and threaded into said socket for fore-aft adjustment of the yoke by rotation of said stem, and a jamb nut threaded onto said stem and engageable with the rear end of said socket to secure the yoke in any selected position of fore-aft adjustment, whereby to provide tilting adjustment of the propeller-spinner unit, said bearing roller being adapted to ride high or low upon said segmental cylindrical bearing face of the yoke depending upon the position of tilting adjustment of the propeller spinner unit.

9. A drive as defined in claim 4, including a lift-lock mechanism comprising a stop lug secured to said swinging housing section on the forward side thereof in the normal position thereof, a bolt mounted in the transom for fore-aft shifting movement and having its rear end normally engaged below said stop lug to prevent rearward swinging of the swinging housing section, and actuator means for moving said bolt forwardly to release said stop lug.

10. A drive as defined in claim 4, including a lift-lock mechanism comprising a stop lug secured to said swinging housing section on the forward side thereof in the normal position thereof, a bolt mounted in the transom for fore-aft shifting movement and having its rear end normally engaged below said stop lug to prevent rearward swinging of the swinging housing section, and actuator means for moving said bolt forwardly to release said stop lug, said actuator means comprising a solenoid secured to the inner side of the transom, an armature in said solenoid to which the forward end of said bolt is attached, and a coil spring surrounding said bolt and engaged under compression against said armature to retract said bolt to the lug releasing position thereof when said armature is deenergized, said armature when energized maintaining said bolt in its rearwardly projected position in obstructing relation to said lug.

11. An outboard drive as defined in claim 4, wherein said steering sleeve has at its lower end an end bearing socket in which said lower end bearing is received and an end flange normal to its axis and surrounding said socket; wherein said propeller and spinner unit is secured to said flange; and wherein said steering arm includes a fork embracing the upper end of said sleeve and having a steering connection therewith.

12. In an outboard drive for a motorboat having an inboard engine and at its rear end a transom: a transmission housing comprising fixed and swinging housing sections including respective mating circular rims; means providing a rotatable bearing connection between said rims maintaining said housing sections in coaxial alignment on a transverse common axis thereof, said fixed housing section having a tubular neck projecting radially forwardly from said transverse axis and terminating in a mounting flange secured to said transom and maintaining said common axis in a horizontal position transverse to the major longitudinal axis of the boat, said swinging housing section having a tubular neck extending radially and normally downwardly from said transverse axis and adapted to swing upwardly from its normally downward position to an overhead position to render the drive mechanism inoperative; a countershaft extending through said housing sections on said common transverse axis and having at its respective ends, means securing the housing sections in rotatable bearing engagement with one another; a drive shaft journalled in said tubular neck of the fixed housing section; a transmitting shaft extending from the interior of said swinging housing through said normally downwardly extending neck thereof; bevel gears on the ends of the respective drive and transmission shafts within the respective housing sections; back-to-back intermediate bevel gears on said countershaft having a direct drive connection with one another and meshing with said first mentioned bevel gears respectively, in transverse offset driving relation therebetween; a steerable unit comprising a sleeve receiving and journalled upon said normally downwardly extending tubular neck and having at its lower end an end bearing socket; a propeller and spinner unit secured to said lower end of the sleeve and including a propeller driven by said transmitting shaft; an end thrust bearing mounted in said end bearing socket and journalling said transmitting shaft in said sleeve; securing means on said transmitting shaft, transmitting through said end thrust bearing to said sleeve, support to maintain said sleeve in telescoping connection with said normally downwardly extending tubular neck; an end thrust bearing mounted in said tubular neck of the swinging housing section above said first mentioned end thrust bearing and supporting said shaft in said swinging housing; a steering arm having a steering connection with the upper end of said sleeve, said arm being inclined laterally from said sleeve and axially upwardly beyond the upper end thereof and terminating in a universal pivot part centered on said common transverse housing axis; and a steering link having a universally pivotal connection with said pivot part and extending horizontally forwardly for connection to a steering actuator said transom having an opening through which said steering link extends, said opening having lateral clearance around said steering link to accommodate lateral shifting thereof in response to arcuate steering movement of said steering arm; and a boot of bellows form secured to the transom at one end of said opening in coaxial relation to the latter and terminating in a collar snugly encircling and sealed to said steering link, said boot accommodating longitudinal and transverse movements of said steering link while maintaining the same sealed to the transom.

13. A drive as defined in claim 4, wherein the bevel gear on the transmitting shaft has a hub seated upon said upper end thrust bearing and is secured to the upper end of said transmitting shaft to provide the support therefor.

14. In an outboard drive for a motorboat having an inboard engine and at its rear end a transom: a transmission housing comprising fixed and swinging housing sections including respective mating circular rims; means providing a rotatable bearing connection between said rims to maintain said housing sections in coaxial alignment on a common axis thereof, said fixed housing section having a tubular neck projecting radially forwardly from said transverse axis, secured to said transom and maintaining said common axis in a horizontal position transverse to the major longitudinal axis of the boat, said swinging housing section having a tubular neck extending radially and normally downwardly from said transverse axis and adapted to swing upwardly from its normally downward position to an overhead position to render the drive mechanism inoperative; a countershaft extending through said housing sections on said common transverse axis having at its respective ends, means securing the housing sections in rotatable bearing engagement with one another; a drive shaft journalled in said tubular neck of the fixed housing section and extending into the latter through the transom and through said normally downwardly extending neck thereof, intermediate bevel gears on the ends of the respective drive and transmission shafts within the respective housing sections, and back-to-back bevel gears on said countershaft having a direct drive connection with one another and meshing with said first mentioned bevel gears respectively, in transverse offset driving relation therebetween and gear shifting means comprising a flexible conduit having one end anchored in said transom and its other end extending into said propeller-spinner unit generally parallel to the axis of said transmission shaft, and a push-pull cable extending through said conduit from within the boat and thence into said propeller-spinner unit and longitudinally slidable in said conduit, said cable and conduit being flexible, being connected to said transom at a point generally above said fixed housing section, entering said propeller-spinner unit at a point substantially centered in front of said steering sleeve, and being looped transversely over the mounting neck of said fixed housing section whereby to accommodate both steering and upward swinging movement of said propeller-spinner unit.

15. In an outboard drive for a motorboat having an inboard engine and at its rear end a transom; a transmission housing comprising fixed and swinging housing sections including respective mating circular rims; means providing a rotatable bearing connection between said rims to maintain said housing sections in coaxial alignment on a common axis thereof, said fixed housing section having a tubular neck projecting radially forwardly from said transverse axis, secured to said transom and maintaining said common axis in a horizontal position transverse to the major longitudinal axis of the boat, said swinging housing section having a tubular neck extending radially and normally downwardly from said transverse axis and adapted to swing upwardly from its normally downward position to an overhead position to render the drive mechanism inoperative; a countershaft extending through said housing sections on said common transverse axis having at its respective ends, means securing the housing sections in rotatable bearing engagement with one another; a drive shaft journalled in said tubular neck of the fixed housing section and extending into the latter through the transom; a transmitting shaft journalled in and extending through said normally downwardly extending neck thereof; bevel gears on the ends of the respective drive and transmitting shafts within the respective housing sections; back-to-back bevel gears on said countershaft having a direct drive connection with one another and meshing with said first mentioned bevel gears respectively, in transverse offset driving relation therebetween; and a lift-lock mechanism comprising a stop lug secured to said swinging housing section on the forward side thereof in the normal position thereof, a bolt mounted in the transom for fore-aft shifting movement and having its rear end normally engaged below said stop lug to prevent rearward swinging of the swinging housing section, and actuator means for moving said bolt forwardly to release said stop lug.

16. A drive as defined in claim 15, said actuator means comprising a solenoid secured to the inner side of the transom, an armature in said solenoid to which the forward end of said bolt is attached, and a coil spring surrounding said bolt and engaged under compression against said armature to retract said bolt to the lug releasing position thereof when said armature is de-energized, said armature when energized maintaining said bolt in its rearwardly projected position in obstructing relation to said lug.

17. In an outboard drive for a motorboat having an inboard engine and at its rear end a transom: a transmission housing comprising fixed and swinging housing sections including respective mating circular rims; means providing a rotatable bearing connection between said housing sections maintaining them in coaxial alignment on a transverse common axis thereof, said fixed housing section having a tubular neck projecting radially forwardly from said transverse axis and terminating in a mounting flange secured to said transom and maintaining said common axis in a horizontal position transverse to the major longitudinal axis of the boat, said swinging housing section having a tubular neck extending radially and normally downwardly from said transverse axis and adapted to swing upwardly from its normally downward position to an overhead position to render the drive mechanism inoperative; transmission means comprising a drive shaft journalled in said tubular neck of the fixed housing section neck, a transmitting shaft extending from the interior of said swinging housing through said normally downwardly extending neck thereof, and gearing connecting the ends of the respective drive and transmitting shafts within the respective housing sections in transverse offset driving relation therebetween; a steerable unit carried by said normally downwardly extending tubular neck for swivelling movement and having at its lower end a propeller and spinner unit including a propeller driven by said transmitting shaft; a steering arm having a steering connection with said steerable unit, said arm terminating in a universal pivot part centered on said common transverse housing axis; and a steering link having a universally pivotal connection with said pivot part and extending horizontally forwardly through said transom for connection to a steering actuator.

18. In an outboard drive for a motorboat having an inboard engine and at its rear end a transom: a transmission housing comprising fixed and swinging housing sections including respective mating circular rims; means providing a rotatable bearing connection between said housing sections maintaining them in coaxial alignment on a transverse common axis thereof, said fixed housing section having a tubular neck projecting radially forwardly from said transverse axis and terminating in a mounting flange secured to said transom and maintaining said common axis in a horizontal position transverse to the major longitudinal axis of the boat, said swinging housing section having a tubular neck extending radially and normally downwardly from said transverse axis and adapted to swing upwardly from its normally downward position to an overhead position to render the drive mechanism inoperative; transmission means comprising a drive shaft journalled in said tubular neck of the fixed housing section neck, a transmitting shaft extending from the interior of said swinging housing through said normally downwardly extending neck thereof, and gearing connecting the ends of the respective drive and transmission shafts within the respective housing sections in transverse offset driving relation therebetween; a steerable unit carried by said normally downwardly extending tubular neck for swivelling movement and having at its lower end a propeller and spinner unit including a propeller driven by said transmitting shaft; and driving thrust transmitting means including a bearing roller rotatably mounted on the forward side of said steering unit sleeve on an axis parallel to the axis of said sleeve, a bearing yoke having a concave bearing face of segmental cylindrical form on a vertical axis facing said steering sleeve and generally coaxial therewith, said bearing roller being in rolling engagement with said bearing yoke, and connecting means adjustably mounting said yoke on said transom, said connecting means comprising a threaded socket secured to said transom on a fore-aft axis, and a threaded stem secured to said yoke and threaded into said socket for fore-aft adjustment of the yoke by rotation of said stem, whereby to provide tilting adjustment of the propeller-spinner unit, said bearing roller being adapted to ride high or low upon said segmental cylindrical bearing surface of the yoke depending upon the position of tilting adjustment of the propeller spinner unit.

19. In an outboard drive for a motorboat having an inboard engine and at its rear end a transom: a transmission housing comprising fixed and swinging housing sections including respective mating circular rims; means providing a rotatable bearing connection between said housing sections maintaining them in coaxial alignment on a transverse common axis thereof, said fixed housing section having a tubular neck projecting radially forwardly from said transverse axis and terminating in a mounting flange secured to said transom and maintaining said common axis in a horizontal position transverse to the major longitudinal axis of the boat, said swinging housing section having a tubular neck extending radially and normally downwardly from said transverse axis and adapted to swing upwardly from its normally downward position to an overhead position to render the drive mechanism inoperative; transmission means comprising a drive shaft journalled in said tubular neck of the fixed housing section neck, a transmitting shaft extending from the interior of said swinging housing through said normally downwardly extending neck thereof, and gearing connecting the ends of the respective drive and transmission shafts within the respective housing sections in transverse offset driving relation therebetween; a steerable unit carried by said normally downwardly extending tubular neck for swivelling movement and having at its lower end a propeller and spinner unit including a propeller driven by said transmitting shaft; and a lift-lock mechanism comprising a stop lug secured to said swinging housing section on the forward side thereof in the normal position thereof, a bolt mounted in the transom for fore-aft shifting movement and having its rear end normally engaged below said stop lug to prevent rearward swinging of the swinging housing section, and actuator means for moving said bolt forwardly to release said stop lug.

20. A drive as defined in claim 19, said actuator means comprising a solenoid secured to the inner side of the transom, an armature in said solenoid to which the forward end of said bolt is attached, and a coil spring surrounding said bolt and engaged under compression against said armature to retract said bolt to the lug releasing position thereof when said armature is de-energized, said armature when energized maintaining said bolt in its rearwardly projected position in obstructing reliaton to said lug.

References Cited in the file of this patent

UNITED STATES PATENTS

| | | |
|---|---|---|
| 1,458,844 | Perkins | June 12, 1923 |
| 1,943,323 | Johnson | Jan. 16, 1934 |